United States Patent
Van Houten

[11] Patent Number: 5,242,024
[45] Date of Patent: Sep. 7, 1993

[54] GRASS TRIMMING DEVICE

[76] Inventor: William Van Houten, 11744 Peachstone La., Orlando, Fla. 32821

[21] Appl. No.: 905,442

[22] Filed: Jun. 29, 1992

[51] Int. Cl.⁵ ............................................... A01B 45/04
[52] U.S. Cl. .................. 172/19; 30/DIG. 7; 30/301; 30/316; 81/488; 172/22
[58] Field of Search ............... 172/19, 21, 22, 25, 172/13, 15, 41; 56/239, 289, DIG. 17; 30/279.2, 287, 300, 301, DIG. 5, DIG. 7; 81/488; 7/114, 158, 170

[56] References Cited

U.S. PATENT DOCUMENTS

| | | | |
|---|---|---|---|
| 1,692,436 | 11/1928 | Deane | 172/22 |
| 2,028,483 | 1/1936 | Van Yahres | 30/DIG. 7 |
| 2,691,823 | 10/1954 | Dombrowski | 30/300 |
| 2,990,615 | 7/1961 | Ohler | 172/21 |
| 3,062,299 | 11/1962 | Koepfinger | 172/19 |
| 3,127,939 | 4/1964 | Rink | 172/25 |
| 3,444,938 | 5/1969 | Ballmann | 172/22 |
| 3,565,179 | 2/1971 | Paliani | 172/19 |
| 3,865,055 | 2/1975 | Gilbaugh | 172/22 |
| 3,951,212 | 4/1976 | Hallman | 172/19 |
| 4,260,026 | 4/1981 | Deckert | 172/25 |
| 4,788,894 | 12/1988 | Mitschele | 81/488 |
| 4,832,131 | 5/1989 | Powell et al. | 172/25 |
| 4,974,682 | 12/1990 | Hoffman | 172/22 |

*Primary Examiner*—Dennis L. Taylor
*Assistant Examiner*—Spencer Warnick
*Attorney, Agent, or Firm*—Leon Gilden

[57] ABSTRACT

A grass trimming device arranged to provide for circular removal of plug members in surrounding relationship about such components as sprinkler heads and the like is formed with a cylindrical body having continuous serrated lower edge spaced from an annular upper edge, with the cylindrical body defined about a body axis, with a handlebar mounted through the cylindrical body orthogonally relative to the axis adjacent the upper edge. The invention is arranged to include a herbicide dispensing structure selectively mounted into the cylindrical body and into the handlebar structure.

4 Claims, 4 Drawing Sheets

GRASS TRIMMING DEVICE

BACKGROUND OF THE INVENTION

1. Field of the Invention

The field of invention relates to grass trimming organizations, and more particularly pertains to a new and improved grass trimming device wherein the same is arranged to provide for a circular removal of grass plugs about sprinkler head components.

2. Description of the Prior Art

The use of lawn sprinkling systems typically utilizes various underground conduits directed to sprinkler heads that are arranged to project upwardly relative to a surrounding lawn area. During lawn mowing procedures, the need to trim such grass is prevented by its proximity relative to the sprinkler head. The instant invention provides for the ease of removal of such grass areas relative to an associated sprinkler head. Prior art structure has been addressed to the removal of grass plugs relative to sprinkler heads and exemplified in the U.S. Pat. Nos. 3,747,213; 3,905,103; U.S. Pat. Nos. Des. 297,498; 4,832,131; and 3,680,639.

The prior art has heretofore been of a cumbersome and elaborate construction as opposed to the instant invention setting forth a compact, unitary organization arranged for the removal of grass plug structure and associated distribution of herbicide and in this respect, the present invention substantially fulfills this need.

SUMMARY OF THE INVENTION

In view of the foregoing disadvantages inherent in the known types of grass trimming apparatus now present in the prior art, the present invention provides a grass trimming device wherein the same is arranged for the removal of cylindrical plug members relative to sprinkler head structure. As such, the general purpose of the present invention, which will be described subsequently in greater detail, is to provide a new and improved grass trimming device which has all the advantages of the prior art grass trimming apparatus and none of the disadvantages. My invention resides not in any one of these features per se, but rather in the particular combination of all of them herein disclosed and claimed and it is distinguished from the prior art in this particular combination of all of its structures for the functions specified.

There has thus been outlined, rather broadly, the more important features of the invention in order that the detailed description thereof that follows may be better understood, and in order that the present contribution to the art may be better appreciated. There are, of course, additional features of the invention that will be described hereinafter and which will form the subject matter of the claims appended hereto. Those skilled in the art will appreciate that the conception, upon which this disclosure is based, may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

Further, the purpose of the foregoing abstract is to enable the U.S. Patent and Trademark Office and the public generally, and especially the scientists, engineers and practitioners in the art who are not familiar with patent or legal terms or phraseology, to determine quickly from a cursory inspection the nature and essence of the technical disclosure of the application. The abstract is neither intended to define the invention of the application, which is measured by the claims, nor is it intended to be limiting as to the scope of the invention in any way.

It is therefore an object of the present invention to provide a new and improved grass trimming device which has all the advantages of the prior art grass trimming apparatus and none of the disadvantages.

It is another object of the present invention to provide a new and improved grass trimming device which may be easily and efficiently manufactured and marketed.

It is a further object of the present invention to provide a new and improved grass trimming device which is of a durable and reliable construction.

An even further object of the present invention is to provide a new and improved grass trimming device which is susceptible of a low cost of manufacture with regard to both materials and labor, and which accordingly is then susceptible of low prices of sale to the consuming public, thereby making such grass trimming devices economically available to the buying public.

Still yet another object of the present invention is to provide a new and improved grass trimming device which provides in the apparatuses and methods of the prior art some of the advantages thereof, while simultaneously overcoming some of the disadvantages normally associated therewith.

These together with other objects of the invention, along with the various features of novelty which characterize the invention, are pointed out with particularity in the claims annexed to and forming a part of this disclosure. For a better understanding of the invention, its operating advantages and the specific objects attained by its uses, reference should be had to the accompanying drawings and descriptive matter in which there is illustrated preferred embodiments of the invention.

BRIEF DESCRIPTION OF THE DRAWINGS

The invention will be better understood and objects other than those set forth above will become apparent when consideration is given to the following detailed description thereof. Such description makes reference to the annexed drawings wherein.

DESCRIPTION OF THE PREFERRED EMBODIMENT

Figure 1:
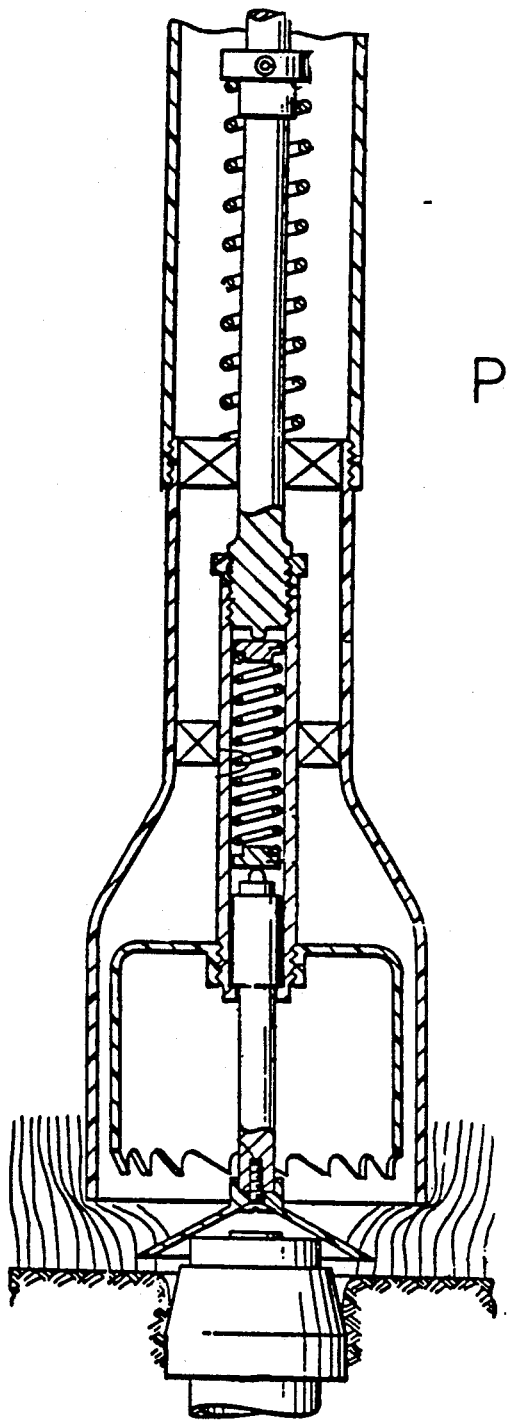
FIG. 1 is an orthographic view, partially in section, of a prior art grass trimming apparatus.

With reference now to the drawings, and in particular to FIGS. 1 to 6 thereof, a new and improved grass trimming device embodying the principles and concepts of the present invention and generally designated by the reference numeral 10 will be described.

Figure 2:
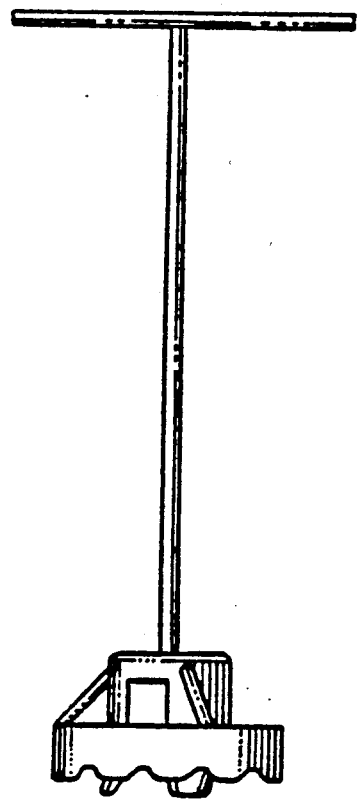
FIG. 2 is an orthographic view of a further example of a grass trimming structure.
Figure 3:
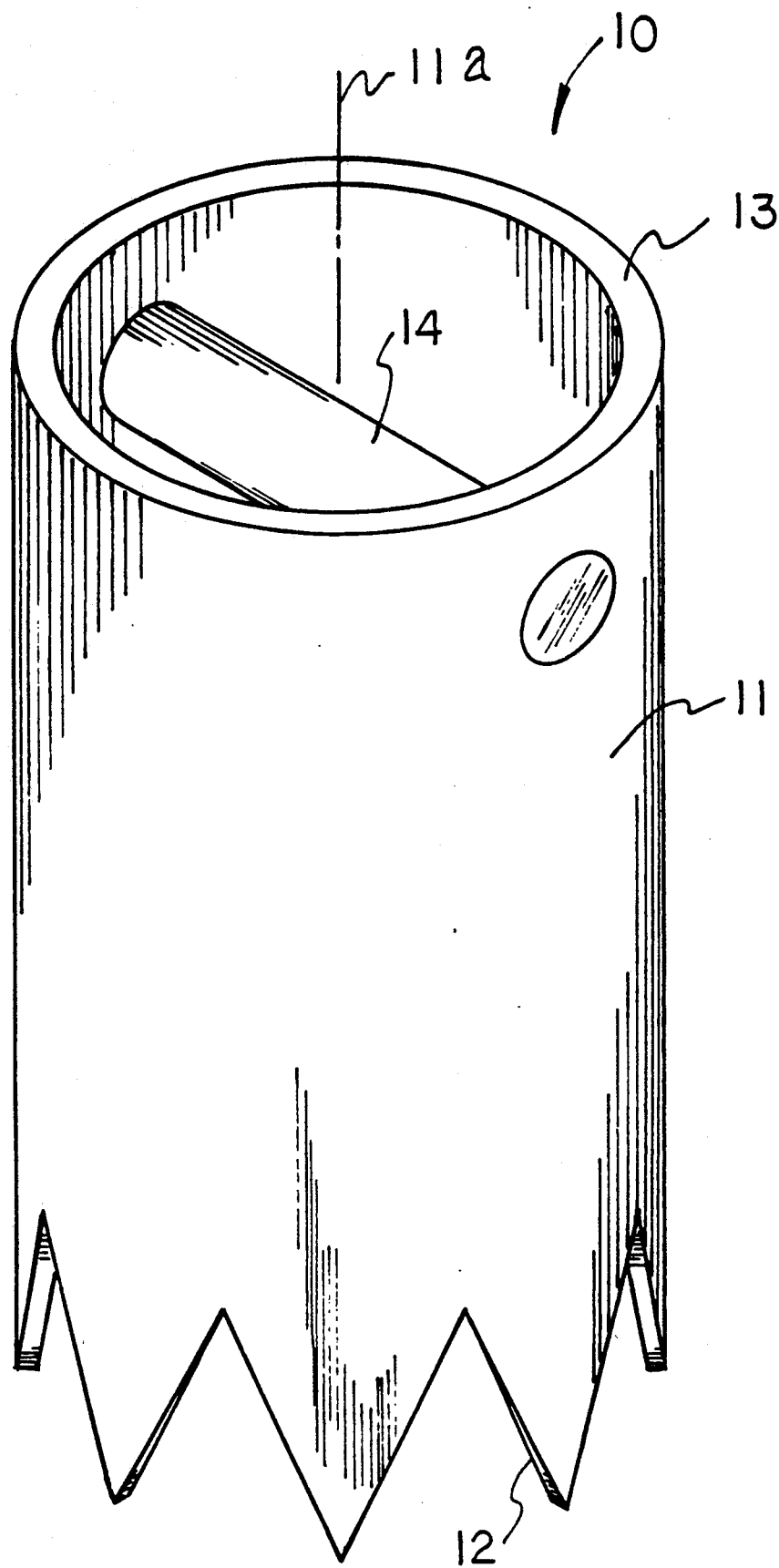
FIG. 3 is an isometric illustration of the instant invention.

FIG. 1 is an orthographic view of a grass trimming device indicated in U.S. Pat. No. 3,905,103 utilizing a spring-loaded cutter structure mounted within a housing and to sever grass relative to a sprinkler head. U.S. Pat. No. Des. 297,498 is depicted in FIG. 2 having a serrated cutter tool mounted fixedly relative to an upwardly extending rod structure.

More specifically, the grass trimming device 10 of the instant invention essentially comprises a cylindrical body 11 defined along a body axis 11a, including a continuous serrated lower edge 12 and an annular upper edge 13. A handlebar 14 is diametrically directed through the cylindrical body 11 adjacent the upper edge 13 orthogonally oriented relative to the body axis 11a. In this manner, grasping of the handlebar 14 and projection of the cylindrical body 11 into associated turfs in surrounding relationship relative to a sprinkler head, in a manner as illustrated in FIG. 1, permits convenient removal of a grass portion about a sprinkler head structure.

Figure 4:
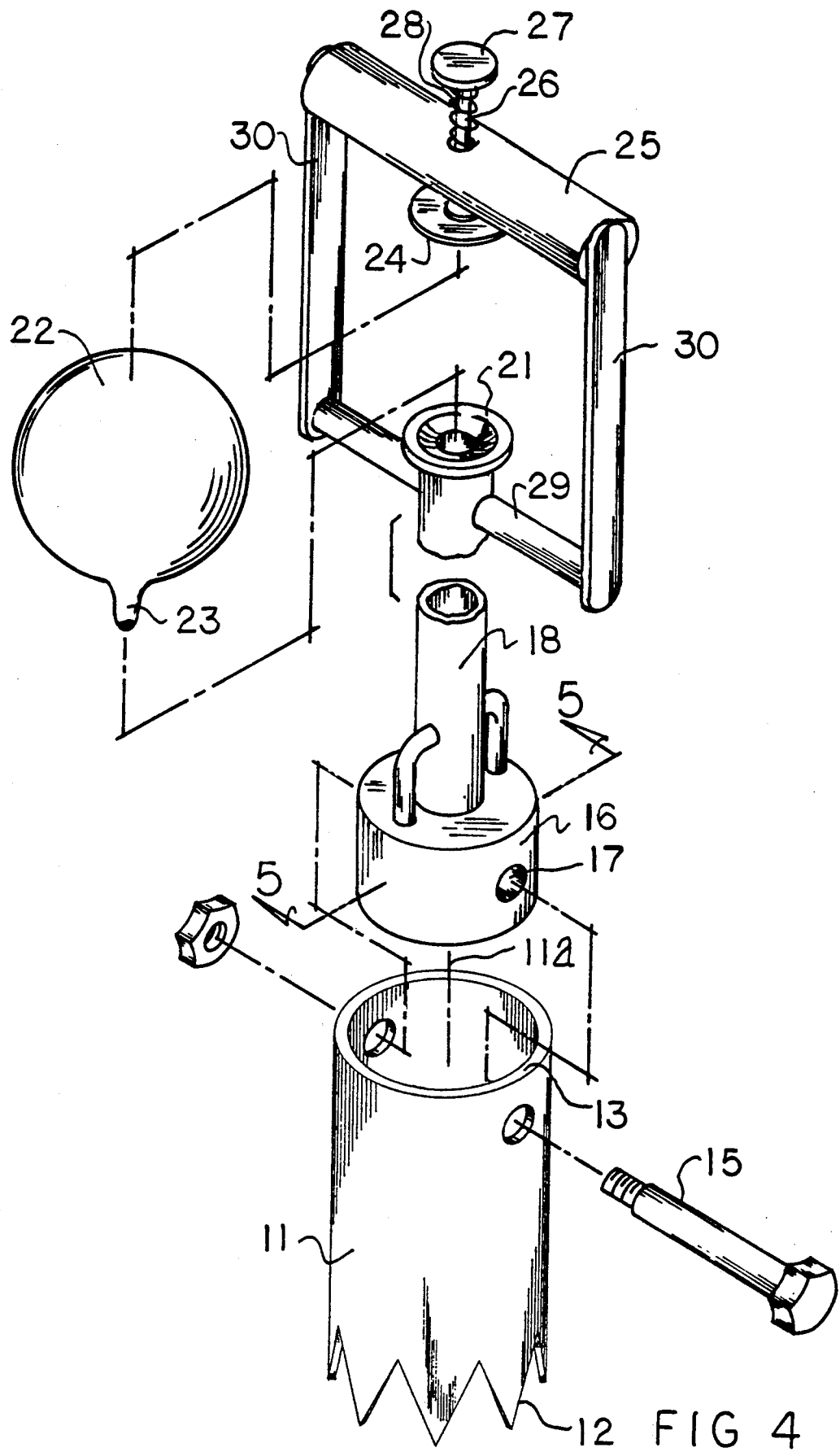
FIG. 4 is an isometric illustration of the invention utilizing a herbicide distribution structure relative to the cylindrical body.
Figure 5:
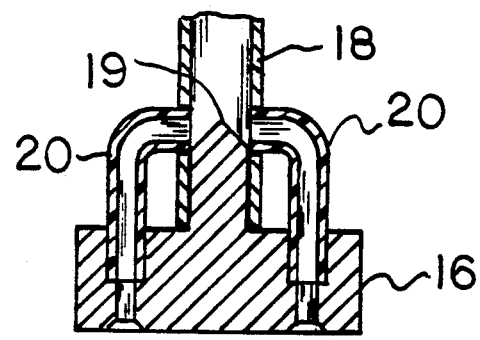
FIG. 5 is an orthographic view, taken along the lines 5—5 of FIG. 4 in the direction indicated by the arrows.

The organization is further arranged, as indicated in FIG. 4, to include s support rod 15 directed into the cylindrical body 11 as a replacement for the handlebar 14. The support rod 15 is received into a manifold housing 16, and more specifically through a mounting bore 17 of the manifold housing 16. The manifold housing includes a conduit tube 18 orthogonally mounted to an upper surface of the manifold housing 16, with the conduit tube 18 having an inverted V-shaped tube floor 19 to direct herbicide from an overlying reservoir into spaced fluid delivery tubes 20 that are in fluid communication with the conduit tube 18 adjacent the tube floor 19 and project from the conduit tube 18 through the manifold housing 16 and exteriorly of the manifold housing through a bottom surface thereof to direct herbicide within the cylindrical body 11 to minimize recurrence of grass growth relative to a sprinkler head subsequent to a severing procedure. A conduit tube annular flange 21 extends peripherally about an upper distal end of the conduit tube 18 to mount a flexible reservoir chamber 22 thereon, with the reservoir chamber 22 having an outlet nozzle 23 directed into the conduit tube 18. A plunger plate 24 is positioned above the reservoir chamber 22 and mounted to a plunger plate rod 26 extending through a support handle 25, with the plunger plate rod 26 having a head 27 projecting above the support handle 25 capturing a spring member 28 between the plunger plate rod head 27 and the support handle 25 to normally bias the plunger plate 24 in a raised orientation relative to the reservoir chamber 22. A conduit support bar 29 fixedly mounted to the conduit tube 18 positions the conduit support bar 29 in a parallel relationship to the support handle 25, having spacer rods 30 orthogonally mounted to the support handle 25 and the conduit support bar 29. The reservoir chamber 22 is typically filled with a herbicide fluid that is directed from the flexible reservoir chamber 22 upon compression of the reservoir chamber by the plunger plate 24 to dispense such herbicide into the cylindrical body 11. The reservoir chambers 22 are readily replaced and/or replenished for subsequent use of the apparatus.

Figure 6:
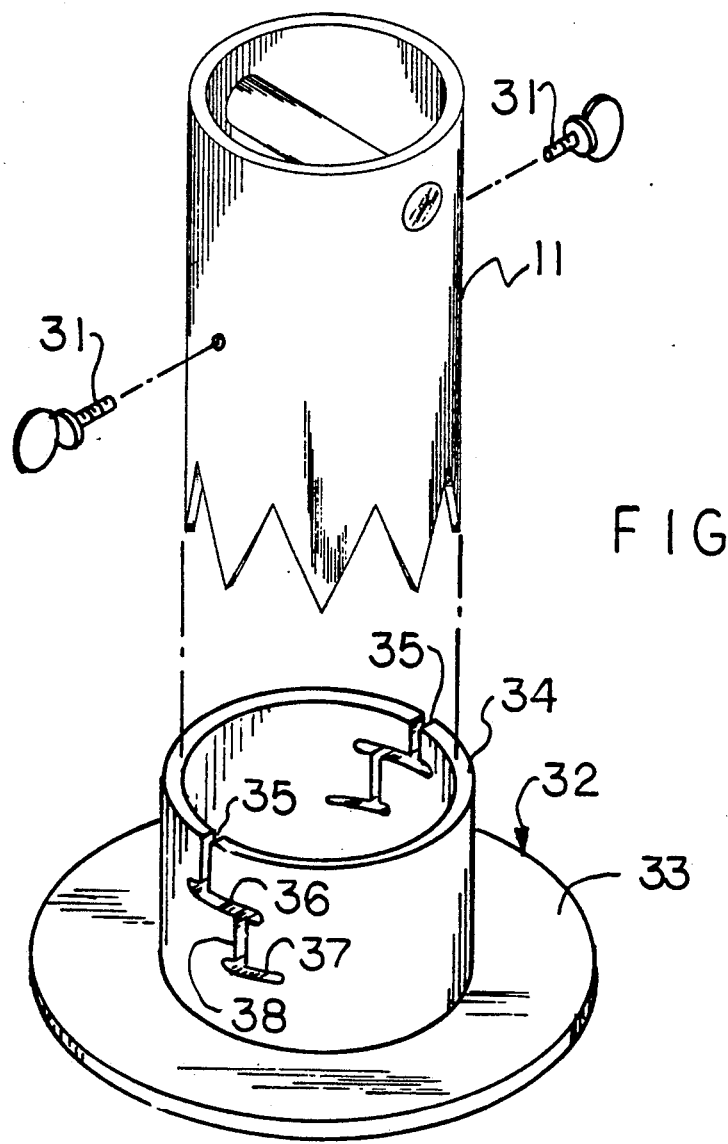
FIG. 6 is an isometric illustration of the invention utilizing a depth gauge structure.

The FIG. 6 indicates the apparatus including a depth gauge 32 cooperative with abutment rods 31 directed into the cylindrical body 11 between the upper edge and the lower edge on diametrically opposed sides of the cylindrical body 11. The depth gauge 32 includes a support plate 33 arranged for positioning upon a lawn surface, with the support plate 33 having a positioning tube 34 mounted fixedly and orthogonally thereon and extending upwardly thereof, with the cylindrical body 11 arranged for sliding reception through positioning tube 34 and the support plate 33. Entrance slots 35 are directed into the positioning tube 34 from an upper edge of the positioning tube 34 orthogonally oriented relative to the underlying support plate 33. The entrance slots 35 are in communication with a first depth slot 36 in an orthogonal relationship and intersecting the first depth slots 36 at a first end of the depth slots, wherein a second end of the depth slots 36 are in communication with a communicating slot 38 directed downwardly and orthogonally relative to the first depth slot 36 intersecting and a second depth slot 37. In this manner, the abutment rods 31 are selectively arranged for abutment with the first or second depth slots 36 and 37 to limit projection of the cylindrical body 11 into an underlying turf for severing of a grass plug in surrounding relationship relative to a sprinkler head.

As to the manner of usage and operation of the instant invention, the same should be apparent from the above disclosure, and accordingly no further discussion relative to the manner of usage and operation of the instant invention shall be provided.

With respect to the above description then, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

What is claimed as being new and desired to be protected by LETTERS PATENT of the United States is as follows:

1. A grass trimming device, comprising,
   a cylindrical body, the cylindrical body defined about a body axis, and
   the cylindrical body including a continuous serrated lower edge spaced from an annular upper edge, and
   a rod member directed through the cylindrical body adjacent the upper edge orthogonally oriented relative to the body axis, and
   a manifold housing, the manifold housing including a mounting bore directed through the manifold housing, the mounting bore receiving the rod member therethrough, the manifold housing including a top surface spaced from a bottom surface, the top surface including a conduit tube fixedly and orthogonally mounted to the top surface extending upwardly relative to the top surface, and the conduit tube having a conduit tube annular flange extending peripherally and exteriorly of the conduit tube at an upper distal end of the conduit tube, and the conduit tube including an inverted V-shaped tube floor, and at least one fluid delivery tube in fluid communication with the conduit tube directed into the conduit tube adjacent the tube floor, with the at least one fluid delivery tube directed through the manifold housing and through the manifold housing bottom surface, and a flexible reservoir chamber mounted on the conduit tube annular flange, with the reservoir chamber having an outlet nozzle directed into the conduit tube below the annular flange.

2. A device as set forth in claim 1 including a plunger plate positioned above the flexible reservoir chamber, the plunger plate including a plunger plate rod fixedly mounted to the plunger plate and a support handle, the support handle slidably receiving the plunger plate rod therethrough in an orthogonal relationship, with the plunger plate rod coaxially aligned relative to the body axis, and the plunger plate rod including a plunger plate rod head spaced above the support handle, and a spring member captured between the plunger plate rod head and the support handle to bias the plunger plate rod in a raised orientation relative to the flexible reservoir chamber, and a conduit support bar fixedly mounted to the conduit tube below the conduit tube annular flange, with the conduit support bar parallel relative to the support handle, with a plurality of spacing rods interconnecting the support handle and the conduit support bar positioning the flexible reservoir chamber between the spacing rods.

3. A device as set forth in claim 2 further including a depth gauge, with the depth gauge including a support plate, the support plate including a support plate bore directed therethrough, and a positioning tube fixedly and orthogonally mounted to the support plate in surrounding relationship relative to the bore, the cylindrical body including at least one abutment rod mounted to the cylindrical body projecting exteriorly thereof, with the positioning tube including an entrance slot directed into the positioning tube orthogonally oriented relative to the support plate, and at least one depth slot directed into the positioning tube at a lower distal end of the entrance slot, with the depth slot orthogonally oriented relative to the entrance slot, and the entrance slot arranged for receiving the abutment rod therewithin.

4. A device as set forth in claim 3 including a further depth slot arranged parallel and below the depth slot, with a communicating slot directed between the depth slot and the further depth slot, with the communicating slot arranged parallel relative to the entrance slot and the depth slot arranged parallel relative to the further depth slot.

* * * * *